May 1, 1928.  1,668,001

J. E. BOLLING

VALVE FOR CONTROLLING OIL BURNERS

Filed Oct. 18, 1924   2 Sheets-Sheet 1

Inventor
John E. Bolling
by Rummler & Rummler
Atty's

May 1, 1928.
J. E. BOLLING
1,668,001
VALVE FOR CONTROLLING OIL BURNERS
Filed Oct. 18, 1924    2 Sheets-Sheet 2
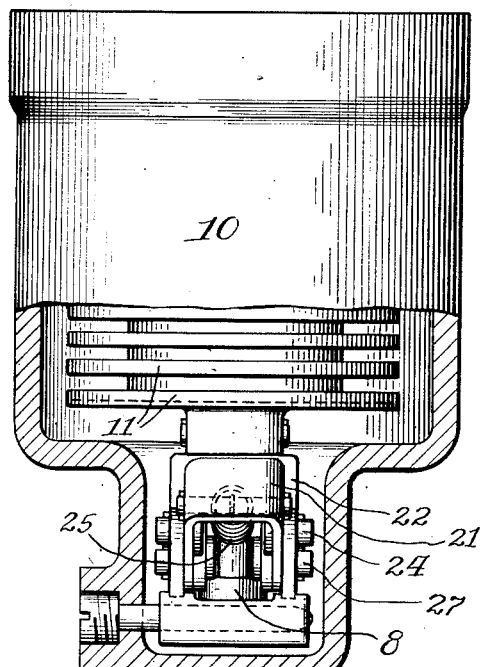
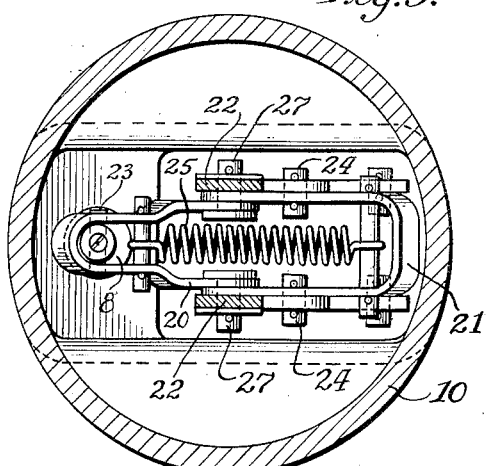
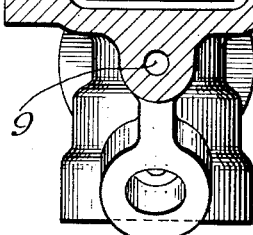
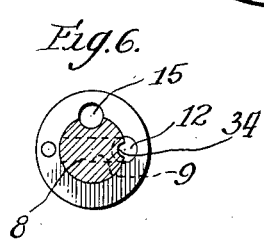
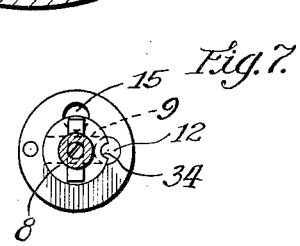
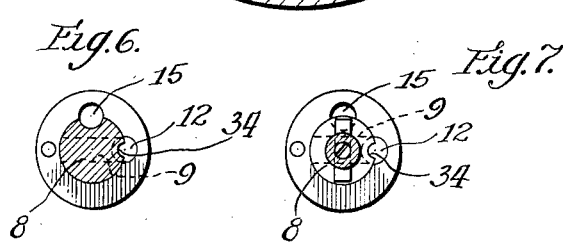
Inventor
John E. Bolling.
by Rummler + Rummler
Atty's.

Patented May 1, 1928.

1,668,001

UNITED STATES PATENT OFFICE.

JOHN E. BOLLING, OF CHICAGO, ILLINOIS, ASSIGNOR TO DRYING SYSTEMS, INC., OF CHICAGO, ILLINOIS, A CORPORATION OF ILLINOIS.

VALVE FOR CONTROLLING OIL BURNERS.

Application filed October 18, 1924. Serial No. 744,423.

This invention relates to an automatic regulating valve designed particularly for use in controlling the flow of fuel from oil burner nozzles.

The purpose of the invention is to provide an arrangement which will insure when required a prompt or abrupt starting and shutting off of the feed of oil to the nozzle in order to prevent a gradual change of flow and consequent dripping of oil from the nozzle upon the starting and stopping of the operation of the burner. Likewise, it is the purpose of the invention to provide means which will upon a starting operation of the burner insure prompt delivery of the fuel under some predetermined pressure and in suitable condition for instant combustion, in order to avoid the preliminary incomplete combustion of the fuel when the mixture of fuel and air varies or flow thereof is increased gradually from zero to the desired rate for the proper operation of the burner. Such last mentioned undesirable operation of oil burners invariably results when there is any appreciable length of tubing or space within which the oil may collect between the burner nozzle and the fuel pump, and when there is no quick acting opening and shut off valve located at the nozzle. A further purpose of the invention is to provide means for draining the fuel from the shut off valve and from the tubing between such nozzle valve and the pump, back to the source of supply of fuel, which means is effective after the valve at the nozzle is closed, in order that when the pump again starts it will immediately pump the fuel, under the desired operating condition, to the nozzle.

These general purposes of the invention, and others are accomplished by a construction as shown in the drawing, in which:—

Fig. 2 is an end view of the valve with the casing partly in section.

Fig. 3 is a sectional view taken on the line 3—3 of Fig. 1.

Fig. 4 is a sectional detail taken along the line 4—4 of Fig. 2.

Fig. 5 is a sectional detail taken along the line 5—5 of Fig. 4.

Figs. 6 and 7 are sectional details taken along the lines 6 and 7 of Fig. 5.

Figure 8:
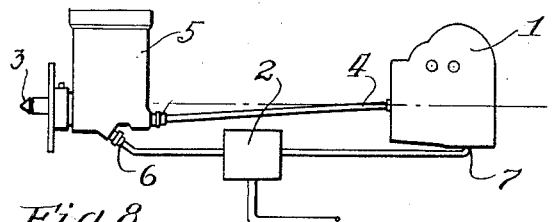

Fig. 8 is a diagrammatic view showing the relationship between the regulating valve, fuel pump and float chamber from which the fuel pump draws the liquid fuel for delivery to the burner nozzle.

The construction illustrated is particularly designed for use in connection with oil burning apparatus such as described in application for patent of James C. Armstrong, Serial No. 738,647, filed September 19, 1924. Oil burners of that class are arranged for delivering a rich mixture of fuel and air to the burner nozzle. The pump is separated from the nozzle by a length of conduit, which conduit might under some circumstances retain some fuel oil after the pump has stopped operating. Then, upon starting an operation of the pump, the fuel in the conduit between the pump and the nozzle is forced through and drips from the nozzle preliminary to the delivery of the jet of fuel and air in the constant normal proportion. Oil burners of this class, designed mainly for house heating purposes, have a capacity in excess of that normally required and therefore are only intermittently operated for short periods. This intermittent operation of the burners results in the likelihood of variation in the richness of the mixture delivered to the nozzle since, upon stopping, some of the fuel oil may remain in the conduit between the nozzle and the pump and upon starting the pressure only gradually rises to the desired point.

The construction illustrated overcomes such undesirable conditions by providing means for draining back to the source of supply any fuel oil which may be in the conduit when the operation of the pump or other delivery means is interrupted. The improved construction also provides for instantly closing a valve located at the nozzle at such cessation of the operation of the pump. Likewise, the same valve automatically opens only after the pump develops the required predetermined pressure in the fuel line leading to the nozzle.

In order to accomplish these purposes, use is made of a valve structure which may open or close communication between the nozzle and its supply conduit and may provide suitable communication between the supply conduit and a return drain, when the valve closes communication between such supply conduit and the nozzle. A spring actuated toggle is provided for producing a quick throw of the valve, this toggle mechanism being in turn under the control of a pressure motor, and the valve is provided with passageways suitable for allowing the pressure to be developed in the motor casing or, when required, allowing any oil which may be in such casing to be drained out back to the source of supply.

Figure 1:
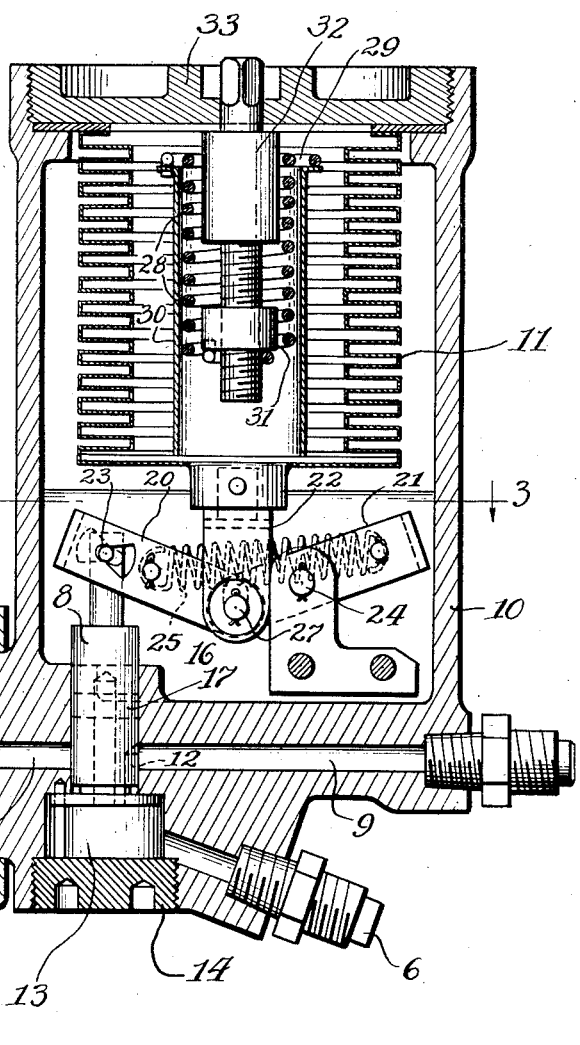
Figure 1 is a vertical sectional view of the regulating valve.

Fig. 8 of the drawing shows in diagram a pump 1, such as above referred to, a float chamber 2 for supplying fuel oil to the pump, a burner nozzle 3, a conduit 4 leading from the pump to the burner nozzle, an improved regulating valve 5 and a return drain conduit 6 from the regulating valve to the float chamber. The pump 1 received its supply of fuel from the float chamber through conduit 7 and is adapted, as explained in the application for patent above referred to, to deliver fuel and air under pressure and at a constant ratio to the conduit 4 and nozzle 3, the pump intermittently operating under thermostatic control. Between operations of the fuel pump, communication between conduit 4 and nozzle 3 is closed by a valve 8, Fig. 1. This valve, however, at such time provides communication between the passageway 9 leading to the conduit 4 and the interior of the casing 10 surrounding the upper part of the valve and also diaphragm motor 11. A passageway 12 in valve 8 provides communication between passageway 9 and a chamber 13 below the valve when the valve is in its upper position, as shown in Fig. 1, at which time it prevents communication between the passageway 9 and nozzle 3. The chamber 13 is closed by a plug 14, but communicates through another passageway 15 in valve 8 with the interior of casing 10 when the valve is in its upper position. Accordingly, when the pump or compressor starts to operate, the pressure developed thereby is communicated to the interior of casing 10, causing an upward movement of the diaphragm motor 11. This results, through an operation of the toggle 16, in throwing the valve 8 downward with its transverse passageway 17 in alinement with the passageways 9 and 18, the latter communicating with the discharge passageway 19 of nozzle 3.

The toggle 16, formed by the arms 20 and 21, is connected by a yoke 22 to the base of the diaphragm motor 11. Thus when the diaphragm motor is compressed, the arms 20 and 21 swing upwardly around their respective pivots 23 and 24. Until the toggle passes its dead center and spring 25 becomes effective for rapidly swinging the arm 20 downwardly around the pivot 27, the valve 8 is thus quickly forced from its closed to its open position. Upon a drop in pressure within the casing 10, which occurs when the operation of compressor 1 is stopped, the diaphragm motor is instantly returned to its normal condition under the action of a coiled tension spring 28 bearing at its end 29 against a tubular member 30 movable with the diaphragm motor and at its opposite end against a collar 31 fixed to a stud 32 extending downwardly from the cap 33 of casing 10. Pressure within casing 10 is relieved through a port 34 in valve 8, this port serving to provide communication between the passageway 9 at the bottom of casing 10 and the interior of the casing when the valve is in its upper position, as shown in Fig. 4. Upon the reverse action of the diaphragm motor 11, as driven by spring 28, the quick throw toggle mechanism is again actuated by spring 25, returning the valve 8 to its upper position where it closes communication between the nozzle 3 and passageway 9. Any oil that may remain in the passageway 9 can drain down into the chamber 13 through the port 12 in valve 8 and likewise any oil which may be in chamber 10 can drain through the port 15 into the chamber 13, from which it is returned by conduit 6 to the float chamber 2.

The operation of the construction is dependent upon changes in pressure in the fuel conduit 4, such changes in pressure in turn being dependent upon operations of a thermostatically controlled motor-driven pump. Normally with the valve 8 closed, any fuel oil in the conduit 4, passageway 9, or within valve casing 10 may drain back into the return conduit 6. Therefore, upon starting the operation of the burner there is little oil which may be pushed along in advance of the required mixture. When the pressure rises to a point sufficient to result in an operation of the diaphragm motor 11, valve 8 rapidly shifts to its fully open position under the action of the quick throw toggle mechanism. Thus when the nozzle does deliver fuel oil, the oil is delivered at full operating pressure without any objectionable preliminary flow of oil under the gradual rising pressure. Also, in the reverse operation of the valve structure, when the pressure falls, due to stopping the motor, the valve is instantly thrown to its fully closed position.

Although but one specific embodiment of this invention has been herein shown and described, it will be understood that details of the construction shown may be altered or omitted, without departing from the invention as defined by the following claims.

I claim:

1. In combination in a fluid fuel burner a fuel nozzle, a fuel conduit leading to said nozzle, a drain opening into said conduit, means for supplying fuel under pressure to said conduit, and a valve controlling the admission of fuel to said nozzle, said valve being adapted to be opened and to simultaneously close said drain by a predetermined pressure in said conduit.

2. In combination in a fluid fuel burner, a fuel nozzle, a pump for supplying a mixture of air and oil under pressure, a constant level oil chamber connected to the oil inlet of said pump, a conduit leading from the outlet of said pump to the nozzle, a drain connection from the nozzle to said chamber, and a valve operated by pressure in said conduit for controlling the connection of said conduit to the nozzle or to said drain connection.

3. In combination in a fluid fuel burner, a burner nozzle, a drain, a fuel supply line, means for supplying fuel under pressure to said line, and a valve operated by the pressure in said line adapted to connect the line to the drain at no pressure, and connect said line to the nozzle at a predetermined pressure.

4. In combination in a fluid fuel burner, a burner nozzle, a fuel supply line leading to said nozzle, means for supplying fuel under pressure to said line, a valve in said line adapted to open the line for draining when the pressure in the line is low and adapted to close the line for draining when there is a predetermined pressure in the line.

Signed at Chicago this 15th day of October 1924.

JOHN E. BOLLING.